United States Patent [19]

Mercier

[11] 4,122,297

[45] Oct. 24, 1978

[54] ELECTRICAL BUSHING

[75] Inventor: Antoine G. Mercier, Tassin la Demi Lune, France

[73] Assignee: Jeumont-Schneider, Puteaux, France

[21] Appl. No.: 846,044

[22] Filed: Oct. 27, 1977

[30] Foreign Application Priority Data

Oct. 28, 1976 [FR] France ................................ 76 32555

[51] Int. Cl.[2] ........................ H01B 17/26; H02H 5/08; H01F 27/00

[52] U.S. Cl. ................................ 174/11 BH; 174/18; 174/31 R; 340/626; 340/646; 361/332

[58] Field of Search .............. 174/11 R, 11 BH, 12 R, 174/12 BH, 18, 31 R; 340/242; 361/332, 333

[56] References Cited

U.S. PATENT DOCUMENTS

| | | | |
|---|---|---|---|
| 2,092,560 | 9/1937 | Runaldue | 174/11 R X |
| 2,151,092 | 3/1939 | Dunsheath | 174/11 R X |
| 2,556,906 | 6/1951 | Del Mar | 174/12 R |
| 3,746,935 | 7/1973 | Wagenaar et al. | 174/11 BH X |
| 4,054,351 | 10/1977 | Gallay et al. | 174/18 X |

FOREIGN PATENT DOCUMENTS

| | | | |
|---|---|---|---|
| 765,668 | 3/1934 | France | 174/11 R |

*Primary Examiner*—Laramie E. Askin

*Attorney, Agent, or Firm*—D. R. Lackey

[57] ABSTRACT

A fluid-filled electrical bushing for connecting an electrical conductor in a fluid-filled transformer to an electrical conductor in another enclosure. The electrical bushing includes a safety device consisting of two coaxial flexible capsules which are joined to a plate disposed therebetween and which respectively communicate with the dielectric fluid in the bushing and with the dielectric fluid in the transformer. The plate, which is movable in opposite axial directions in response to the pressure difference between the dielectric fluid in the bushing and the dielectric fluid in the transformer acting thereon, alternately engages first or second electrical contacts to complete an electrical circuit indicating an over-pressure condition caused by internal arcing, or the abnormal expansion or an insufficient amount of dielectric fluid within the bushing.

3 Claims, 1 Drawing Figure

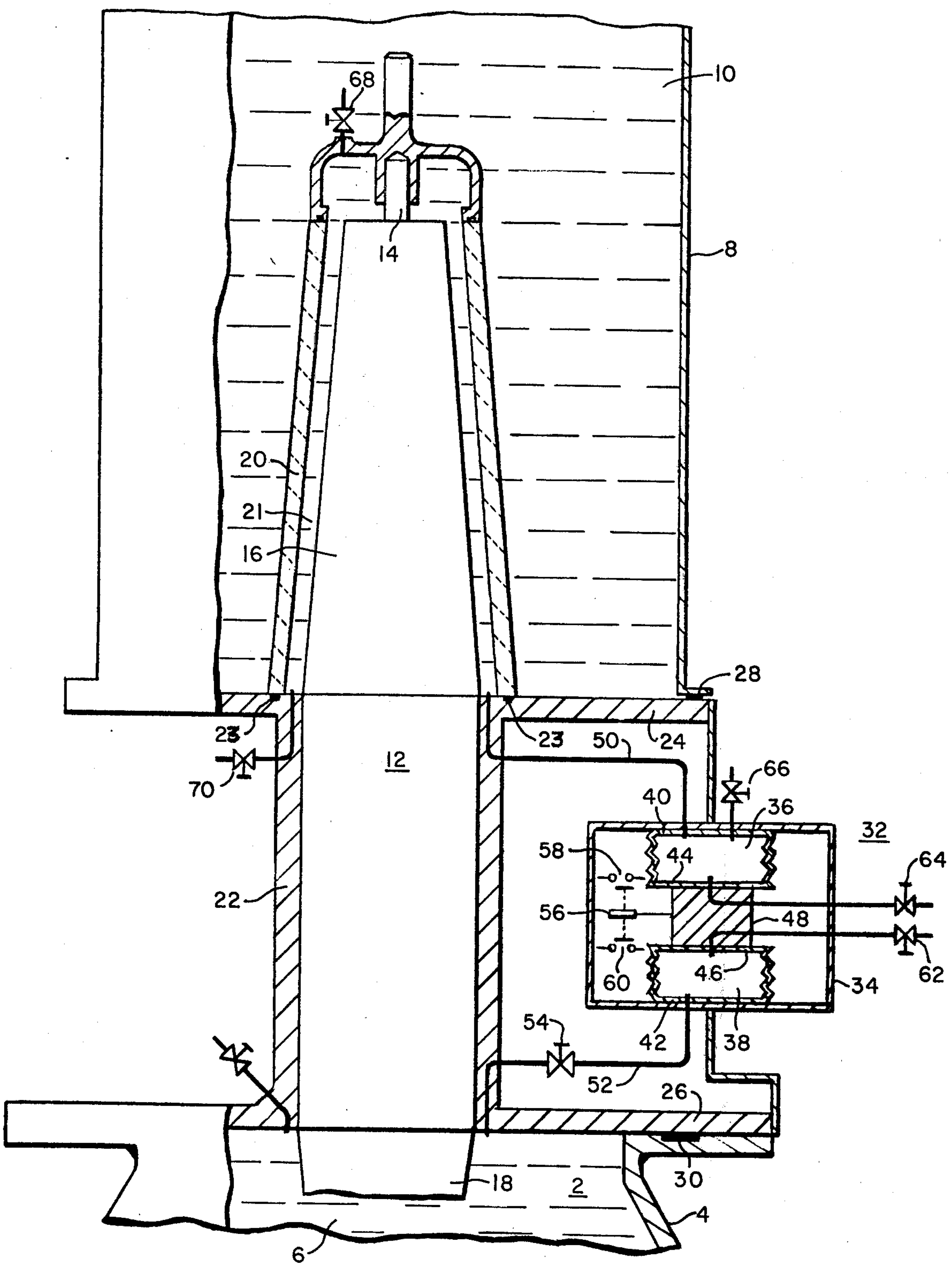
10
68
8
14
20
21
16
28
23
23
50
24
12
70
66
40
36
32
58
44
64
56
48
22
62
60
46
34
54
42
38
52
26
18
2
30
4
6

ELECTRICAL BUSHING

BACKGROUND OF THE INVENTION

1. Field of the Invention

This invention relates, in general, to electrical bushings and, more particularly, to fluid-filled electrical bushings for connecting transformer windings to dielectric fluid-filled bus ducts.

2. Description of the Prior Art

Connecting the electrical winding of a transformer, reactor, regulator, etc., to another electrical apparatus or conductor usually involves an electrical bushing assembly. The bushing is attached to the transformer case with its internal end connected to the winding and its external end connected to the conductor. In some applications, the conductor is housed in a duct which is filled with a dielectric fluid, such as oil, or a gaseous dielectric, such as sulfur hexafluoride, under a predetermined pressure.

Bus-conductor ducts present specialized problems in making the electrical connection between the bus-conductor and the winding lead of the transformer. It is difficult to contain the oil within the bus duct since the oil, when subjected to an electrical arc, may give rise to an explosion. Similarly, the sulfur hexafluoride gas used in pressurized bus ducts has a tendency to seep into the fluid-filled bushings contained therein which, again, may give rise to a pressure induced explosion. Although pressure sensing devices, such as pressure switches, have been used to detect increased pressure within the bushing caused by the above-named factors, such devices are generally inefficient since they must be set to operate at a pressure higher than the pressure caused by normal temperature excursions of the dielectric fluid within the bushing.

Thus, it would be desirable to provide an electrical bushing wherein the risk of an explosion is substantially reduced. It would also be desirable to provide an electrical bushing which includes means for indicating an abnormal internal pressure condition caused by arcing, expansion of the dielectric fluid within the bushing as would occur as the result of excessive heating, or the introduction of pressurized gaseous dielectric into the bushing itself.

SUMMARY OF THE INVENTION

Herein disclosed is an electrical bushing for connecting the winding of a fluid-filled transformer to a conductor disposed within a dielectric fluid-filled bus duct. The electrical bushing includes a novel safety device which substantially reduces the risk of explosion due to internal arcing, abnormal expansion of the dielectric fluid within the bushing or the introduction of pressurized gaseous dielectric into the bushing housing. The safety device includes two coaxially aligned, deformable manometric capsules which are joined to a plate disposed therebetween. The upper capsule is disposed in fluid communication with the dielectric fluid within the bushing; while the lower capsule is in fluid communication with the dielectric fluid in the transformer. This places pressure on both sides of the plate which is indicative, respectively, of the pressure of the dielectric fluid contained within the bushing and of the dielectric fluid within the transformer. The plate is movable in opposing axial directions in response to a difference between the pressure acting on either side thereof. When the pressure of the dielectric fluid within the transformer exceeds the pressure within the bushing, as would be caused by a shortage of dielectric fluid within the bushing, the plate will move in a first direction to close an electrical contact thereby completing an electrical circuit connected to a suitable alarm. When the pressure within the bushing exceeds that within the transformer, as the result of internal arcing within the bushing, the abnormal expansion of the dielectric fluid filling the bushing due to excessive heating or should the pressurized gaseous dielectric in the bus duct leak into the bushing, the plate will move in the opposite direction to close a second electrical contact again completing the electrical circuit connected to the alarm. By utilizing a safety device responsive to the difference between the pressures of the dielectric fluids within the bushing and the transformer, the novel electrical bushing of this invention compensates for the temperatures of the various dielectric fluids and provides a more effective and accurate indication of abnormal pressure conditions within the bushing which, accordingly, substantially reduces the risk of a pressure-induced explosion.

BRIEF DESCRIPTION OF THE DRAWING

The various features, advantages, and other uses of this invention will become more apparent by referring to the following detailed description and drawing, in which there is shown a partial elevational view, partly in section and partly broken away, of an electrical bushing constructed according to the teachings of this invention.

DESCRIPTION OF THE PREFERRED EMBODIMENT

Referring now to the drawing, there is shown an upper portion of an electrical transformer 2. A tank 4 surrounds the magnetic core and winding assembly of the transformer 2 and contains a fluid dielectric 6, such as transformer oil, which provides insulation and cooling for the core and winding assembly. Also shown, is a bus duct 8 which encloses an electrical conductor, not shown, and contains a fluid dielectric 10. The fluid dielectric may be any suitable material, such as sulfur hexafluoride ($SF_6$) which can be under, for example, a relative pressure of 3 atmospheres at 20° C. and under a maximum pressure of 4 atmospheres.

An electrical bushing 12 is provided to connect the electrical winding of the transformer 2 to the electrical conductor within the bus duct 8. The bushing 12 includes a substantially cylindrical center member or casing 22 having upper and lower flanges 24 and 26, respectively. The lower flange 26 is secured to the top of the tank 4 of the transformer 2 by suitable means, not shown, with a sealing gasket 30 positioned at the joint therebetween to form a fluid-tight seal. The upper flange 24 is connected to a flange on the bus duct 8 by suitable means with a sealing gasket 28 disposed therebetween to form a gas-tight seal.

A substantially cylindrical lead or conductor 14 is coaxially and concentrically aligned with the center member 22. A condenser section 16 concentrically surrounds and insulates the lead 14. The lower portion 18 of the lead 14 and condenser section 16 extends within the dielectric fluid 6 in the tank 4 of the transformer 2 and is connected to the winding of the transformer 2. In addition, the lead 14 and condenser section 16 pass through the center member 22 in sealing relation to form a fluid seal between the fluid-filled transformer 2 and the bus duct 8 enclosures. The lead 14 also connects to the electrical conductor within the bus duct 8 by any suitable means, not shown.

An upper casing 20, consisting of an annular vessel made of suitable insulating material, such as porcelain, surrounds the lead 14 and condenser section 16 within the bus duct 8 with the end of the lead 4 extending there-through in sealed relation. The upper casing 20 is secured to the first flange 24 of the center member 22 by suitable means, not shown, with a sealing gasket 23 positioned at the junction thereof. The upper casing 20 is spaced from the lead 14 and condenser section 16 to form a duct 21 wherein a dielectric fluid is disposed to cool the lead 14. As described above, the duct 21 is sealed from the dielectric fluid 10 within the bus duct 8 and also from the dielectric fluid 6 in the transformer 2.

According to the preferred embodiment of this invention, a novel safety device 32 is provided to indicate an abnormal pressure build-up within the bushing 12 prior to a pressure-induced explosion. The safety device 32 is mounted within a rigid frame 34 which is secured to the upper and lower flanges 24 and 26 of the center member 22 of the bushing 12. Contained within the rigid frame 34 are two deformable manometric capsules 36 and 38 which are coaxially aligned about a common vertical axis. Each of the capsules 36 and 38 consists of, for example, Sylphon bellows. The first ends 40 and 42 of the bellows 36 and 38, respectively, are joined by suitable means to the upper and lower portions of the frame 34. The second ends 44 and 46 of the bellows 36 and 38, respectively, are connected to opposite sides of a plate 48 which is movable in opposing axial directions under the effect of the relative changes in the volumes of the two bellows 36 and 38.

A conduit or pipe 50 disposes the first bellows 36 in fluid communication with the duct 21 within the upper casing 20 of the bushing 12 such that changes in the pressure of the dielectric fluid contained therein cause a change in the volume of the first bellows 36. Similarly, the second bellows 38 is disposed in fluid communication with the dielectric fluid 6 contained within the tank 4 of the transformer 2 by a conduit or pipe 52 which also includes a shut-off valve 54.

A suitable contact actuating means, such as rod 56, is connected to the plate 48 for closing a first switchable electrical contact 58 upon movement of the plate 48 in a first axial direction and for closing a second switchable electrical contact 60 upon movement of the plate 48 in the other axial direction. The contacts 58 and 60 form an electrical circuit which is connected to a suitable alarm or signal device to provide a means for indicating abnormal pressure build-up within the bushing 12.

The procedure to set up the safety device 32 for proper operation will now be described. When the transformer tank 4 is filled with dielectric fluid 6 and is solely under the pressure of the fluid column in the transformer expansion tank, not shown, bellows 38 is filled with dielectric fluid 6 from the transformer 2 by opening the shut-off valve 54 in the conduit 52 and the purging valve 62 connected to the bellows 38. The purging valve 62 is closed as soon as the dielectric fluid 6 begins to escape from it. In order to fill the other bellows 36 with dielectric fluid from the bushing 12, the temperature of the dielectric fluid is first measured. Draining valve 64, connected to the second or lower end of the bellows 36, is then closed and the purging valve 66 at the upper end of the bellows 36 is opened along with the purging valve 68 at the upper end of the upper casing 20 of the bushing 12. Dielectric fluid is then introduced into the duct 21 within the upper casing 20 of the bushing 12 by gravity or by means of a pump through valve 70. The purging valves 66 and 68 are closed when the dielectric fluid begins to flow therethrough. Filling is continued by means of a pump until the lower end 44 of the bellows 36 reaches a position corresponding to the previously measured temperature of the dielectric fluid at which time the rod 56 connected to the bearing plate 48 will be disposed in an intermediate position between the first and second contacts 58 and 60.

During normal operation, the pressure within the two bellows 36 and 38 is approximately the same. Should arcing occur within the bushing 12, or the pressurized $SF_6$ gas leak into the bushing 12 or should there be an abnormal expansion of the dielectric fluid within the bushing due to excessive heat, the volume and the pressure within the bellows 36 would be greatly increased. The increased pressure acting upon one side of the plate 48 results in a pressure difference thereacross which causes the plate 48 and the rod 56 connected thereto to move in an axial direction towards the second bellows 38. The rod 56 will cause the second electrical contact 60 to close thereby completing the alarm circuit and signalling the occurrence of one of the abnormal conditions described above. Conversely, a shortage of dielectric fluid within the bushing 12 would cause a pressure decrease within the first bellows 36. Since the pressure within the second bellows 38 would then exceed that within the first bellows 36, a pressure difference would again exist across the plate 48 which would drive the plate 48 in an axial direction towards the first bellows 36 and cause the rod 56 to close the first electrical contact 58 again completing the alarm circuit.

It will be apparent to one skilled in the art that there has been herein disclosed an electrical bushing suitable for connecting an electrical transformer to a conductor contained within a separate bus duct which provides increased safety of operation by reducing the possibility of a pressure-induced explosion. By utilizing flexible bellows to detect a pressure difference between the dielectric fluid contained within the bushing and the oil within the transformer, the novel electrical bushing of this invention senses abnormal pressure increases within the bushing caused by arcing, expansion of the dielectric fluid within the bushing due to excessive heating or the introduction of pressurized gaseous dielectric from the bus duct into the bushing. The resulting pressure difference between the two flexible bellows causes axial movement of a plate connected therebetween which closes an electrical alarm circuit thereby signalling the abnormal pressure condition within the bushing in advance of a pressure induced explosion. The amount of pressure increase necessary to signal an abnormal pressure build-up within the bushing is reduced over prior art safety devices since the use of flexible bellows compensates for the normal temperature excursions of the dielectric fluids and thereby provides a more accurate indication of pressure build-up within the bushing.

What is claimed is:

1. Electrical bushing for connecting an electrical conductor in a first enclosure to an electrical conductor in a second enclosure, at least said second enclosure having dielectric fluid disposed therein, said bushing comprising:

a first casing disposed within said first enclosure;

a second casing sealingly joined to said first casing and to said first enclosure on one end and to said second enclosure on the other end;

an electrical lead extending through said first and second casings to connect said electrical conductors in said first and second enclosures, respectively;

said first casing being spaced from said electrical lead to form a duct therebetween;

means sealing said duct from said first and second enclosures;

dielectric fluid disposed within said duct in said first casing;

first and second coaxial deformable capsules;

said first capsule being disposed in fluid communication with said duct in said first casing such that the volume of said first capsule changes in response to the pressure of said dielectric fluid contained within said duct;

said second capsule being disposed in fluid communication with said dielectric fluid in said second enclosure such that the volume of said second capsule changes in response to the pressure of said dielectric fluid contained within said second enclosure;

a plate disposed between said first and second capsules and movable in first and second opposing axial directions in response to changes in the volumes of said first and second capsules; and means indicating when the pressure of said dielectric fluid in said duct is substantially different from the pressure of the dielectric in said second enclosure; said indicating means including an electrical circuit having first and second switchable electrical contacts;

said plate closing said first electrical contact to complete said electrical circuit upon movement in said first axial direction and closing said second electrical contact to complete said electrical circuit upon movement in said second axial direction.

2. The electrical bushing of claim 1 wherein the first enclosure contains a gaseous dielectric fluid and the dielectric fluid in the second enclosure comprises oil.

3. A safety device for a dielectric fluid-filled electrical bushing having one end disposed in a dielectric fluid-filled transformer and another end disposed in another dielectric fluid-filled enclosure, comprising:

first and second coaxial deformable capsules;

a movable plate disposed between and connecting said first and second capsules;

said first capsule being disposed in fluid communication with said dielectric fluid in said electrical bushing for exerting a first pressure on one side of said plate;

said second capsule being disposed in fluid communication with said dielectric fluid in said transformer for exerting a second pressure on the other side of said plate;

said plate being movable in first and second axial directions in response to the difference between said first and second pressures acting thereon; and an electrical circuit having first and second electrical contacts;

said plate closing said first electrical contact when said second pressure exceeds said first pressure acting thereon and closing said second electrical contact when said first pressure exceeds the second pressure acting thereon.

* * * * *